Patented Jan. 18, 1949

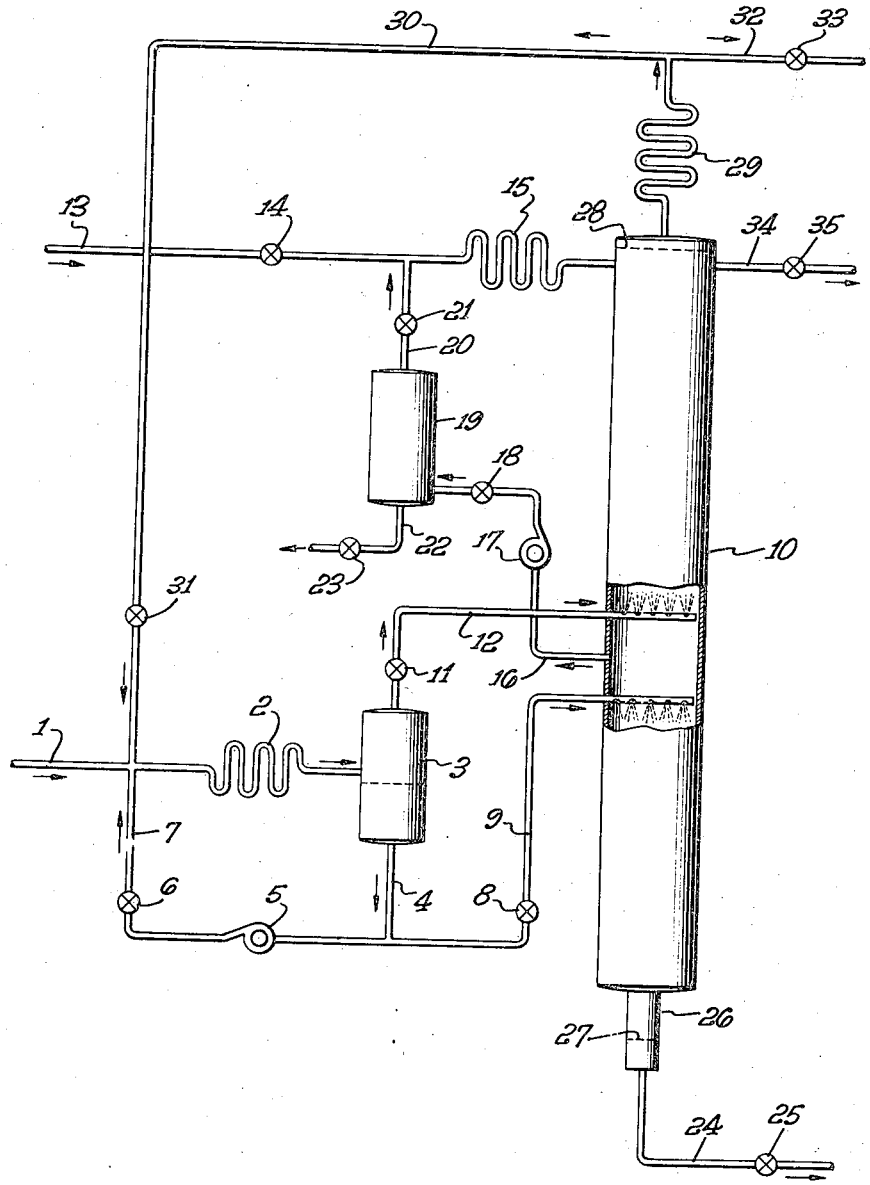

2,459,690

UNITED STATES PATENT OFFICE 2,459,690

OXIDATION OF CYCLOALIPHATIC HYDROCARBONS AND ALCOHOLS

Thomas F. Doumani, Los Angeles, Clarence S. Coe, Long Beach, and Edward C. Attané, Jr., Inglewood, Calif., assignors to Union Oil Company of California, Los Angeles, Calif., a corporation of California Application May 2, 1945, Serial No. 591,568

9 Claims. (Cl. 260—533)

This invention relates to a continuous process for the nitration of hydrocarbons and relates particularly to a process for the simultaneous nitration and oxidation of cycloparaffinic hydrocarbons.

It is known that cycloparaffinic hydrocarbons such as cyclohexane may be reacted with nitric acid to produce both nitrocyclohexane and adipic acid. Little work has been reported on this process, however, and the reports indicate that only batch operations have been carried out, and that neither the nitration to form nitrocyclohexane nor the oxidation to adipic acid is carried out selectively. Thus, in order to convert cyclohexane relatively completely to adipic acid, it has been necessary to convert the nitrocyclohexane formed to adipic acid by a roundabout process involving conversion to a sodium salt, hydrolysis of the salt to form cyclohexanone, and oxidation of the cyclohexanone to adipic acid. The adipic acid so produced is generally of low purity, containing large amounts of succinic and glutaric acids.

It is an object of this invention to provide a simple continuous process whereby cyclohexane may be converted substantially completely to adipic acid of unusual purity. The efficiency of the process is believed to be due to the utilization of the discovery that nitrocyclohexane and its homologs may be converted directly to dibasic acids such as adipic acid by direct oxidation with nitric acid, and also the discovery that the nitrogen oxides formed by the decomposition of the nitric acid in this reaction, or by means of simple pyrolysis of nitric acid in the absence of hydrocarbon, are even more effective than is nitric acid for the conversion of cyclohexane to nitrocyclohexane.

The process of this invention briefly consists in introducing nitric acid into a column containing liquid cyclohexane, and introducing the nitric acid at a point somewhere near the middle of the column, i. e. at a point remote from either end of the column. The temperature and pressure on the column and its contents are elevated so as to partially decompose the nitric acid introduced, with the formation of oxides of nitrogen including nitrogen dioxide. The nitrogen dioxide and other gaseous products of the decomposition then travel upward in the column through the heated cyclohexane and convert the cyclohexane to nitrocyclohexane, while reducing the nitrogen dioxide to lower oxides including nitric oxide. The nitrocyclohexane so formed travels downwardly through the column and is contacted with the residual aqueous liquid nitric acid and is oxidized thereby to adipic acid. The adipic acid so produced, being soluble in the spent aqueous nitric acid, dissolves therein and forms a solution which falls to the bottom of the column and is continuously withdrawn. The adipic acid is then recovered from this solution by conventional means such as crystallization.

The efficiency of the above process is greatly enhanced by the fact that the oxides of nitrogen, which convert the cyclohexane to nitrocyclohexane are fairly soluble in the cyclohexane and therefore are in perfect contact therewith. Also the liquid nitric acid solution selectively dissolves the nitrocyclohexane from the cyclohexane and thus provides excellent intimacy of contact for the oxidation thereof. Thus the nitric acid is relatively completely spent, and the adipic acid produced is not maintained in contact with concentrated nitric acid for any prolonged period. This results in the production of a large yield of adipic acid and in minimizing the destruction of adipic acid to form lower diabasic acids such as succinic and glutaric. In fact the entire dibasic acids recovered in this process will be found to consist of 80 to 90% or higher adipic acid, whereas by conventional batch processes the adipic acid constitutes generally about 50 to 60% of the dibasic acids produced.

It should be understood that it is not possible to isolate each individual reaction in the above process, since so many competing reactions are involved. For example, nitric acid when heated decomposes to form principally nitrogen dioxide and oxygen, but the vapors will also contain water and nitric acid vapors as well, in small amounts. Nitrogen dioxide will also react with water to form nitric acid and nitric oxide; and nitric oxide will react with oxygen to form nitrogen dioxide. Nitrogen dioxide reacts readily with cyclohexane, the principal product being nitrocyclohexane, but the cyclohexane or the nitrocyclohexane may be further oxidized by nitrogen dioxide, (though less readily), to form adipic acid. The latter may also be oxidized by nitric acid or nitrogen dioxide to form the lower dibasic acids, glutaric and succinic, as well as carbon dioxide and water. The reaction products of nitric acid and nitrocyclohexane are largely adipic acid and nitrogen dioxide, but considerable nitric oxide is also formed. Also nitric acid may react directly with cyclohexane to produce both nitrocyclohexane and adipic acid, with production of nitrogen dioxide, nitric oxide, nitrous oxide and other decomposition products as indiated above. It will be clear therefore that the reaction in any portion of the column in the above process is not clearcut, and depends largely on the reactions taking place in other parts of the column. It is believed that the efficiency of the above process is due to the fact that these reactions are combined in an optimum manner to produce large yields of relatively pure adipic acid, with minimum consumption of oxidizing agent.

Two principal modes of carrying out the process of this invention are preferred. Both involve the general process described above. In one mode of operation the conditions within the column are maintained so that fractional distillation takes place. Thus nitric acid and cyclohexane may be introduced into the middle portion of a fractionating column maintained under elevated temperature and pressure, the temperature increasing from the top to the bottom of the column. The nitrocyclohexane formed in the reaction is separated from the cyclohexane as formed because of its lower volatility. The nitric acid introduced also tends to dissolve the nitrocyclohexane and oxidizes it to adipic acid, which dissolves in the aqueous phase moving down the column and is withdrawn continuously with the aqueous phase from the bottom of the column. The column is designed so as to provide for sufficient holdup in the column to accomplish these reactions. A considerable portion of the column is above the feed inlet so that any nitrogen dioxide formed in the above reactions will have ample opportunity to react with cyclohexane and be reduced to nitric oxide in the upper part of the column, and thus provide for relatively complete utilization of the oxidizing agent.

In the second mode of operation the conditions within the column are not distillation conditions but extraction conditions. Thus the nitric acid feed is introduced into the middle section of the column as above, but it is not necessary that the temperature increase from the top to the bottom of the column as in distillation. Conditions are maintained within the column which are optimum for the reaction of cyclohexane with nitrogen dioxide in the upper portion of the column, and conditions which are optimum for the oxidation of nitrocyclohexane by nitric acid are maintained in the lower portion of the column. The cyclohexane feed may be introduced into any portion of the column, but is preferably introduced near the top of the column.

In both of the above modes of operation the reaction is carried out substantially in the liquid phase. It is also desirable to maintain the interface between the oil phase and the aqueous phase at the bottom of the column, withdrawing the aqueous solution as it accumulates. It is also desirable to preheat the nitric acid to decompose it partially prior to its introduction into the reaction column. The gaseous and liquid phases resulting from this thermal decomposition may be separated and introduced separately into the column. At the top of the column a reflux condenser should be provided to prevent loss of cyclohexane or nitric acid, and condense these and return them to the column, allowing only the fixed gases such as nitric oxide, nitrogen and the like to be released. It is highly desirable furthermore that a portion of the fixed gases so released be recycled to the nitric acid feed. By this means the nitric oxide recycled will react with the oxygen produced in the decomposition of the nitric acid, forming additional nitrogen dioxide, which is more desirable than is oxygen, for use in the upper part of the column, where nitration is desired primarily. The recycle gas may be purified before re-introduction into the column, if desired, as by removal of carbon dioxide by contact with soda ash or the like.

When cyclohexane obtained from petroleum is employed as a feed stock, it usually happens that it is contaminated with small amounts such as about 2 to 20% of isoparaffins, which are difficult to separate from cyclohexane. Small amounts of benzene may also be present as a contaminant in cyclohexane which is derived from petroleum, from coal tar, or from hydrogenation of benzene. These contaminants are all readily nitrated by either nitric acid or nitrogen dioxide, so some means of removing the resulting reaction products from the system is desirable. This may be done by withdrawing a portion of the oily phase from the column, removing the undesired materials therefrom and returning the remainder to the column. The oily phase is preferably withdrawn from the column at a point near or below the point of introduction of the nitrating agent. For example, it may be just below this point, or it may be just above the interface maintained in the bottom of the column. The material withdrawn will consist of unreacted cyclohexane, nitrocyclohexane, and nitroparaffins, or nitroaromatics, or undesirable products of side reactions such as polymerization. These may be separated by conventional means such as distillation, solvent extraction or the like and the cyclohexane and nitrocyclohexane may be returned to the column. The nitroparaffins and nitroaromatics may be purified or freed from the undesirable polymers and the like by distillation, extraction, etc. and recovered for other uses. An example of the extraction mode of operation of the process of this invention is shown in the drawing.

Referring to the drawing, nitric acid is introduced through line 1 and heater 2 into separator 3. The nitric acid is decomposed in heater 2 so as to form a gaseous phase and a liquid phase which are separated in separator 3. The liquid phase is withdrawn through line 4 and part of it may be recycled through pump 5, valve 6 and line 7 to line 1, while the remainder passes through valve 8 and line 9 to the lower portion of column 10. The gaseous phase from separator 3 passes through valve 11 and line 12 to the upper part of column 10. Hydrocarbon feed such as cyclohexane is introduced into the upper part of column 10 through line 13, valve 14 and preheater 15. The hydrocarbon passes downwardly through column 10 countercurrent to the flow of gaseous oxides introduced through line 12, and is nitrated thereby. The reaction product consisting of unreacted material plus nitrated material is withdrawn from column 10 at a point below line 12 through line 16, pump 17 and valve 18 into column 19 wherein it is separated by distillation into a fraction containing unreacted hydrocarbons, which fraction is recycled through line 20 and valve 21 to line 13, and a fraction comprising nitrated hydrocarbons which is withdrawn through line 22 and valve 23. This fraction may be further separated if desired into a fraction comprising nitrocyclohexane and a fraction comprising nitroparaffins or other by-product fractions, and the nitronaphthene fraction may be recirculated to column 10 either through line 13 or through line 9, or a separate line entering column 10 somewhere between lines 9 and 13. That portion of the nitration mixture of reaction products which is not withdrawn through line 16 passes downward through column 10 and is contacted therein with the liquid aqueous phase introduced through line 9. This aqueous phase comprising nitric acid selectively dissolves the nitrated hydrocarbons from the mixture and oxidizes the dissolved nitro compounds to form water soluble dibasic acids such as adipic acid. The aqueous phase thus obtained, consisting of dibasic acids dissolved in spent nitric acid, is withdrawn from the bottom of column 10 through line 24 and valve 25, and the dibasic acids are recovered therefrom by conventional means such as fractional crystallization. The bottom of column 10 is desirably equipped with a constricted portion 26 of smaller diameter than the main portion of the column and the interface between the oil phase and the aqueous phase is maintained therein as at point 27. The main portion of column 10 down to the constricted portion and up to the top of the column at about point 28 is filled with conventional packing material such as Raschig rings. A liquid level is maintained at about point 28 at the top of the column and the gases resulting from the reactions, consisting largely of nitric oxide, are withdrawn through a reflux condenser 29. A portion of these gases is recycled to line 1 through line 30 and valve 31 while the remainder is withdrawn through line 32 and valve 33. These gases may then be treated to convert them again to nitric acid or nitrogen dioxide which may be recirculated to line 1. If desired liquid may be withdrawn from the top of the column through line 34 and valve 35 for purposes of sampling or maintenance of liquid level. Water may also be introduced into the column if desired, at this point, or at any point lower in the column. This will be particularly desirable where solid dibasic acids are formed at such a rapid rate that they precipitate within the column and threaten to interfere seriously with the fluid flow through the column. Shell 36 represents a temperature control means which may be a series of electrical heaters to maintain the desired temperatures within column 10.

In the distillation mode of operation, the process may be carried out in the same manner as indicated above, maintaining the temperature in the lower part of the column sufficiently high to vaporize the cyclohexane. Thus the constricted portion 26 of the column may be enlarged to provide a reboiler in which the aqueous phase and probably some nitrocyclohexane is present in the liquid phase which is boiling. The bulk of the reaction takes place in the column itself, which is designed to provide sufficient liquid holdup so that the reaction is relatively complete and substantially in the liquid phase.

As a specific example of an operation in which the distillation mode of operation is employed cyclohexane and nitric acid of 70% concentration were separately introduced into a fractionating column at rates of 11 and 17 ml./min. respectively. This is equivalent to a molal ratio of nitric acid to cyclohexane of 2.6. The column was a stainless steel column packed with Raschig rings and having an efficiency of approximately 8 theoretical plates with a liquid holdup of about 156 ml. About 40 ml. of this holdup was accomplished by the use of a small trap located within the column and into which the feed stocks were introduced. The preheated feed stocks were mixed and introduced into the middle section of the column at a point about two-thirds of the distance from the bottom to the top of the packed section. Just below the packed section of the column an electrically heated reboiler was provided, which was equipped with a liquid trap for removal of the liquid aqueous phase. The column was equipped with electrical heaters capable of preheating the column and maintaining substantially adiabetic conditions during the reaction. At the top of the column above the packed section a water cooled reflux condenser was provided to reduce the temperature of the gases taken overhead to approximately room temperature and return any materials thereby condensed to the column. Beyond the reflux condenser a pressure regulator was provided to maintain the pressure on the system at 100 pounds per sq. in. gage, i. e. about 8 atmospheres. The temperature in the reboiler was maintained at about 145° C.; the temperature between the reboiler and point of introduction of feed was maintained between about 70° C. and 130° C.; and the temperature above the feed point and below the reflux condenser was maintained between about 60 and 70° C. Aqueous phase was withdrawn from the reboiler at an average rate of about 30 ml./min. This aqueous phase was found to contain about 60% of dissolved dibasic acids, the bulk of which crystallized readily upon mere cooling to room temperature. It was found that the dibasic acids present in the withdrawn solution constituted approximately 85% adipic acid, 10% glutaric acid and 5% succinic acid.

As a specific example of an operation employing the extraction mode of operation illustrated in the drawing, nitric acid of 50% strength was preheated to a temperature of 150° C. and introduced into a separator from which the aqueous phase and the gaseous phase were continuously withdrawn and charged to an extraction column, the gaseous phase being charged just above the point of entrance of the liquid phase. Cyclohexane was preheated to a temperature of 125° C. and introduced into the top of the column just below the liquid level. The rates of introduction of nitric acid and cyclohexane were approximately 12 and 4 ml./min. respectively, corresponding to a molal ratio of nitric acid to cyclohexane of about 3. The column had an internal diameter of about 5 cm. and a length measured through the packed section of about 3 meters. The nitric acid phases were introduced at a point about one-third of the distance from the bottom to the top of the packed section, and the cyclohexane was introduced just above the top of the packed section. The interface between the aqueous and oily phases was maintained just below the bottom of the packed section and a reflux condenser was provided above the packed section as in the example above. The pressure on the column was maintained at about 8 atmospheres, by withdrawal of gaseous products of reaction which consisted largely of nitric oxide. About 1 liter per minute of this gas was recirculated to the nitric acid preheater. The temperature in the lower part of the column was maintained at about 110° C., and the temperature in the upper part of the column was maintained at about 135° C. About 21 grams per minute of aqueous phase was withdrawn from the bottom of the column and this aqueous phase was found to contain about 55% by weight of dibasic acids. These dibasic acids constituted about 90% adipic, 7% glutaric and 3% succinic.

In another operation of the above type, a hydrocarbon feed stock consisting of about 80% cyclohexane, 17% isoparaffins of similar boiling point, and 3% of benzene, and a small proportion of methyl cyclopentane was employed. The conditions of operation were very similar except that an oily phase was withdrawn from the column at a point just below the point of introduction of the gaseous nitrating agent. This oily phase was withdrawn at an average rate of about 3 ml./min. It was found to consist of principally unreacted cyclohexane and nitrocycloparaffins. A considerable proportion of nitroparaffins was also present, and a small amount of nitrobenzene. This phase was distilled to recover unreacted cyclohexane and nitrocyclohexane, which were returned to the column, and to recover the nitroisoparaffins and nitroaromatics. The latter were recovered in amounts corresponding to substantially complete reaction of the isoparaffins and the aromatics in the feed stock. The aqueous phase recovered from the bottom of the column contained about 40% dibasic acids, and these were found to contain more than 85% adipic acid.

In all three of these specific examples the aqueous phase from which the dibasic acids were recovered was dilute nitric acid corresponding to about 5% strength, indicating substantially complete utilization of the nitric acid.

Although the above description has been confined almost entirely to the treatment of cyclohexane for the production of adipic acid, the process may be employed for the production of dibasic acids other than adipic and for reaction of cycloparaffin hydrocarbons other than cyclohexane. For example, cyclopentane may be reacted with nitric acid as above to produce substantially pure glutaric acid; dimethyl cyclopentane and methyl cyclohexane yield largely succinic acid; and other cycloparaffins and alkylated cycloparaffins such as cycloheptane, methyl cyclopentane, ethyl cyclohexane and the like may be reacted to form glutaric acid, succinic acid, adipic acid, heptanedioic acid and the like, the succinic acid predominating in the products from most of these latter reactions. The nitric acid employed may have a strength between 20 and 80% by weight, preferably 40 to 70% since acid of greater strength tends to convert the cycloparaffins to aromatic hydrocarbons. The acid may be decomposed at temperatures between about 100° C. and 300° C. The temperatures in the lower part of the reaction column may be between 60 and 180° C. but are preferably between 100 and 130° C. The temperatures in the upper part of the column may also be between 60 and 180° C. but are preferably between 110 and 160° C. The pressure on the column may be between about 1 and 20 atmospheres, preferably above 3 atmospheres, and should be sufficient to maintain substantially all of the reactants in the liquid phase. The molal ratio of nitric acid to cycloparaffin is preferably about 3 to 1. Where cyclohexane is employed the theoretical value required for an overall reaction according to the following equation is 3.3 to 1.

$10HNO_3 + 3C_6H_{12} \rightarrow 3C_4H_8(COOH)_2 + 10NO + H_2O$

Similar equations may be written for oxidation of other hydrocarbons employed as feed stocks and approximately the theoretical amounts required for the reaction to the dibasic acid desired with production of nitric oxide should be employed. The size of the column employed and the point of introduction of the nitric acid should be so controlled as to provide for substantially complete reaction.

Where hydrocarbon feed stocks which are contaminated with paraffins and/or aromatics are employed it has been found that the separation of the nitroparaffins, nitroaromatics and nitronaphthenes may be accomplished not only by fractional distillation as indicated above but may be accomplished by selective solvent extraction using concentrated nitric acid as the selective solvent. The nitroaromatics are most soluble in concentrated nitric acid and the acyclic nitroparaffins are least soluble in the concentrated nitric acid but even the nitroparaffins are much more soluble than are the hydrocarbons themselves.

It is also within the scope of this invention to employ a modification of the above process in which the reactions in the upper part of the column and in the lower part of the column as described above are carried out in separate columns. Thus, nitrogen dioxide or the gaseous phase resulting from the decomposition of nitric acid may be introduced into the first column, where it contacts the cycloparaffin and reacts with it to produce a mixture of nitrocycloparaffin and unreacted cycloparaffin, and a gaseous phase which is largely nitric oxide. The oily liquid recovered from this column may be passed to a second column in which it is reacted with nitric acid which is preferably introduced to the second column so as to flow countercurrently to the oily phase, to form the dibasic acids which are dissolved in the spent nitric acid. The aqueous phase from this second column, and any additional aqueous phase recovered from the first column may then be treated for recovery of the dibasic acids therefrom.

The gases produced in the second column, which will contain substantial amounts of nitrogen dioxide, may be recirculated to the first column. The reaction conditions for the first column and the second column are those indicated for the upper part and the lower part of the single column operations as described above.

The process and apparatus of this invention may also be applied to the preparation of water soluble organic acids from other oily liquid organic feeds, such as olefins, halogenated hydrocarbons, alcohols, ketones, and aldehydes, nitriles and isonitriles, ethers and thioethers and the like. It is especially applicable to the preparation of dibasic acids from unsaturated cyclic olefins such as cyclohexene, methyl cyclohexene, ethyl cyclopentene and the like; or from substituted naphthenes in which a hydroxy group has been substituted for one of the hydrogens in the naphthenes described above. For example cyclohexanol may be reacted to form adipic acid.

Where "nitrogen dioxide" is employed herein, it is understood that this is to include nitrogen tetroxide, with which it may be in equilibrium under many of the conditions existing in the reaction. Other modifications of this invention which would occur to one skilled in the art are to be included in the scope of the invention as defined in the following claims.

We claim:

1. A process for the preparation of dibasic acids which comprises establishing a vertical column of oily liquid comprising cycloparaffins, maintaining said oily liquid at an elevated temperature and pressure, preheating nitric acid so as to decompose a portion thereof with production of a gaseous phase comprising nitrogen dioxide and an aqueous liquid phase comprising nitric acid, contacting said gaseous phase with said cycloparaffin in the upper part of said column and thereby forming a liquid nitration reaction product comprising nitrocycloparaffins and unreacted cycloparaffins, contacting said liquid nitration reaction product in the lower part of said column with said aqueous liquid phase comprising nitric acid, and thereby oxidizing said nitrocycloparaffins to form dibasic acids.

2. A process according to claim 1 in which a gaseous phase comprising nitric oxide is withdrawn from the top of said column, and a portion of the withdrawn gas is recycled to the nitric acid feed.

3. A process according to claim 1 in which the temperatures in the column are between about 60° C. and 180° C., and the pressure is above about 3 atmospheres.

4. A process according to claim 1 in which the dibasic acid is adipic, the cycloparaffin is cyclohexane and the molal ratio of nitric acid to cyclohexane employed is about 3 to 1.

5. A process according to claim 1 in which the dibasic acid is succinic, and the cycloparaffin feed comprises dimethyl cyclopentane.

6. A process for the preparation of organic acids by the oxidation of a liquid cycloaliphatic hydrocarbon with nitric acid which comprises establishing a vertical column of said cycloaliphatic hydrocarbon, maintaining said cycloaliphatic hydrocarbon at an elevated temperature and pressure, continuously introducing aqueous nitric acid into said column of cycloaliphatic hydrocarbon at a point near its middle, introducing said cycloaliphatic hydrocarbon near the top of said column, contacting that portion of said column of cycloaliphatic hydrocarbon which is above the point of introduction of nitric acid with gaseous decomposition products of said nitric acid and contacting that portion of said column of liquid which is below the point of introduction of said nitric acid with aqueous nitric acid so as to convert said liquid to organic acids and dissolve said acids in said aqueous nitric acid, withdrawing gaseous reaction products from top of said column, and withdrawing said aqueous solution of said organic acids from the bottom of said column.

7. A process according to claim 6 in which the nitric acid is preheated so as to decompose a portion thereof with production of a gaseous phase comprising nitrogen dioxide and an aqueous liquid phase comprising nitric acid, and said phases are separated and are separately introduced into the upper and lower portions respectively of said column of cycloaliphatic hydrocarbon.

8. A process for the preparation of organic acids which comprises establishing a vertical column of a liquid cycloaliphatic derivative selected from the group of cycloaliphatic hydrocarbons and cycloparaffin alcohols having from 5 to 8 carbon atoms, maintaining said liquid cycloaliphatic derivative at an elevated temperature and pressure, preheating nitric acid so as to decompose a portion thereof with production of a gaseous phase comprising nitrogen dioxide and an aqueous liquid phase comprising nitric acid, contacting said gaseous phase with said cycloaliphatic derivative in the upper part of said column and thereby forming a liquid nitration reaction product comprising nitrocycloaliphatic derivatives and unreacted cycloaliphatic derivatives, contacting said liquid nitration reaction product in the lower part of said column with said aqueous liquid phase comprising nitric acid, and thereby oxidizing said nitrocycloaliphatic derivatives to form organic acids.

9. A process as set forth in claim 8, in which the cycloaliphatic derivative is cyclohexane.

THOMAS F. DOUMANI.
CLARENCE S. COE.
EDWARD C. ATTANÉ, Jr.

REFERENCES CITED

The following references are of record in the file of this patent:

UNITED STATES PATENTS

| Number | Name | Date |
|---|---|---|
| 1,541,274 | Perkins | June 9, 1925 |
| 1,952,694 | Watson | Mar. 27, 1934 |
| 1,966,187 | Schirm | July 10, 1934 |
| 2,088,497 | Tijmstra | July 27, 1937 |
| 2,121,324 | Manley | June 21, 1938 |
| 2,173,456 | Sullivan | Sept. 19, 1939 |
| Re. 21,556 | Fenske et al. | Sept. 10, 1940 |
| 2,228,261 | Ellingboe | Jan. 14, 1941 |
| 2,285,601 | McAllister | June 9, 1942 |
| 2,298,387 | Kenyon et al. | Oct. 13, 1942 |
| 2,312,468 | Ebel et al. | Mar. 2, 1943 |
| 2,323,861 | Zellner | July 6, 1943 |
| 2,338,830 | Werntz | Jan. 11, 1944 |
| 2,343,534 | Cavanaugh et al. | Mar. 7, 1944 |
| 2,352,513 | Brandt | June 27, 1944 |

FOREIGN PATENTS

| Number | Country | Date |
|---|---|---|
| 830,222 | France | July 25, 1938 |

OTHER REFERENCES

Aschan, "Ber. Deut. Chem. Ges.," vol. 32, pages 1769-1771.

Nametkin, "Ber. Deut. Chem. Ges.," vol. 42, (1909), pages 1372-1376.

Allen S. Smith and J. B. Lunk, "Interfacial Level Control in Extraction Column," Chemical and Metallurial Engineering, April 1944, page 115.